United States Patent
Soeholm et al.

(10) Patent No.: US 7,275,533 B2
(45) Date of Patent: Oct. 2, 2007

(54) PRESSURE CONTROLLER FOR A MECHANICAL DRAFT SYSTEM

(75) Inventors: Soeren Soeholm, Langeskov (DK); Michael Beisheim, Atlanta, GA (US); Steen Hagensen, Atlanta, GA (US)

(73) Assignee: Exhausto, Inc., Roswell, GA (US)

( * ) Notice: Subject to any disclaimer, the term of this patent is extended or adjusted under 35 U.S.C. 154(b) by 322 days.

(21) Appl. No.: 10/712,516

(22) Filed: Nov. 13, 2003

(65) Prior Publication Data
US 2004/0185770 A1 Sep. 23, 2004

Related U.S. Application Data

(60) Provisional application No. 60/453,086, filed on Mar. 6, 2003.

(51) Int. Cl.
F23N 3/00 (2006.01)
F23N 5/24 (2006.01)
F23N 3/06 (2006.01)

(52) U.S. Cl. .................. 126/299 R; 454/238; 454/239; 416/174; 415/111; 415/175

(58) Field of Classification Search .............. 126/85 B, 126/307 R, 312, 110 R–99 D; 454/238, 454/239; 415/111, 175; 416/174
See application file for complete search history.

(56) References Cited

U.S. PATENT DOCUMENTS

| | | | | |
|---|---|---|---|---|
| 3,402,654 A | * | 9/1968 | Berst | 454/229 |
| 3,951,336 A | * | 4/1976 | Miller et al. | 454/238 |
| 4,086,781 A | * | 5/1978 | Brody et al. | 62/180 |
| 4,160,407 A | * | 7/1979 | Duym | 454/61 |
| 4,199,950 A | * | 4/1980 | Hakanson et al. | 60/605.3 |
| 4,352,349 A | * | 10/1982 | Yoho | 126/299 R |
| 4,402,303 A | | 9/1983 | Koenneman | 126/307 |
| 4,437,511 A | * | 3/1984 | Sheridan | 165/48.2 |
| 4,770,340 A | | 9/1988 | Takata | 236/14 |
| 4,773,311 A | * | 9/1988 | Sharp | 454/56 |
| 4,822,385 A | | 4/1989 | Strege et al. | 55/248 |
| 4,903,685 A | | 2/1990 | Melink | 126/299 |
| 5,039,006 A | * | 8/1991 | Habegger | 236/11 |
| 5,090,303 A | * | 2/1992 | Ahmed | 454/58 |
| 5,121,720 A | * | 6/1992 | Roberts | 123/196 S |
| 5,139,009 A | | 8/1992 | Walsh | 126/299 |
| 5,148,977 A | | 9/1992 | Hibino et al. | 236/49.3 |
| 5,205,783 A | * | 4/1993 | Dieckert et al. | 454/238 |
| 5,244,147 A | | 9/1993 | Furukawa | 236/15 |

(Continued)

FOREIGN PATENT DOCUMENTS

JP 01-102230 * 4/1989

(Continued)

*Primary Examiner*—Carl D. Price
(74) *Attorney, Agent, or Firm*—Thomas, Kayden, Horstemeyer & Risley, LLP.

(57) ABSTRACT

Systems and method for controlling the flow of air through a mechanical draft system are disclosed herein. A pressure controller for controlling air pressure comprises an appliance controller configured to control the operation of a plurality of appliances, an intake fan controller configured to control the speed of an intake fan, and an exhaust fan controller configured to control the speed of an exhaust fan. The pressure controller also includes a processor configured to receive a differential pressure signal and to control the operation of the appliances, the speed of the intake fan, and the speed of the exhaust fan in response to the differential pressure signal.

8 Claims, 8 Drawing Sheets

U.S. PATENT DOCUMENTS

| | | | | |
|---|---|---|---|---|
| 5,247,806 A | | 9/1993 | Ebisu et al. | 62/204 |
| 5,257,736 A | * | 11/1993 | Roy | 236/49.3 |
| 5,257,958 A | * | 11/1993 | Jagers | 454/238 |
| 5,282,770 A | * | 2/1994 | Shibata | 454/239 |
| 5,410,890 A | | 5/1995 | Arima | 62/228.4 |
| 5,505,057 A | | 4/1996 | Sato et al. | 62/231 |
| 5,572,104 A | | 11/1996 | Nold et al. | 318/672 |
| 5,579,993 A | | 12/1996 | Ahmed et al. | 236/49.3 |
| 5,642,784 A | | 7/1997 | Guay et al. | 169/61 |
| 5,682,826 A | | 11/1997 | Hollenbeck | 110/147 |
| 5,720,658 A | * | 2/1998 | Belusa | 454/238 |
| 5,791,155 A | | 8/1998 | Tulpule | 62/211 |
| 5,793,646 A | | 8/1998 | Hibberd et al. | 364/505 |
| 5,988,860 A | * | 11/1999 | Hefferen et al. | 700/276 |
| 6,009,939 A | | 1/2000 | Nakanishi et al. | 165/209 |
| 6,059,194 A | | 5/2000 | Wintrich et al. | 236/15 |
| 6,126,080 A | | 10/2000 | Wada | 236/51 |
| 6,142,142 A | | 11/2000 | Woodall, III et al. | 126/299 |
| 6,142,784 A | | 11/2000 | Wood | 434/201 |
| 6,145,751 A | | 11/2000 | Ahmed | 236/51 |
| 6,152,375 A | | 11/2000 | Robison | 236/51 |
| 6,170,480 B1 | * | 1/2001 | Melink et al. | 126/299 R |
| 6,213,404 B1 | | 4/2001 | Dushane et al. | 236/51 |
| 6,230,980 B1 | | 5/2001 | Hudson | 236/44 |
| 6,237,854 B1 | | 5/2001 | Avni | 236/51 |
| 6,241,156 B1 | | 6/2001 | Kline et al. | 236/49.3 |
| 6,250,560 B1 | | 6/2001 | Kline et al. | 236/49.3 |
| 6,264,111 B1 | | 7/2001 | Nicolson et al. | 236/51 |
| 6,283,380 B1 | | 9/2001 | Nakanishi et al. | 236/49.3 |
| 6,283,851 B1 | * | 9/2001 | Smith et al. | 454/256 |
| 6,290,141 B1 | | 9/2001 | Park et al. | 236/513 |
| 6,307,343 B1 | | 10/2001 | Lee et al. | 318/472 |
| 6,332,408 B2 | | 12/2001 | Howlett et al. | 110/189 |
| 6,338,437 B1 | | 1/2002 | Kline et al. | 236/49.3 |
| 6,348,790 B1 | * | 2/2002 | Aler et al. | 324/207.25 |
| 6,349,883 B1 | | 2/2002 | Simmons et al. | 236/46 |
| 6,385,510 B1 | | 5/2002 | Hoog et al. | 700/276 |
| 6,401,708 B1 | | 6/2002 | Kim et al. | 126/116 |
| 2001/0042792 A1 | | 11/2001 | Kline et al. | 236/49.3 |
| 2002/0014538 A1 | * | 2/2002 | Weimer et al. | 236/51 |
| 2002/0029096 A1 | | 3/2002 | Takai et al. | 700/276 |

FOREIGN PATENT DOCUMENTS

| | | | |
|---|---|---|---|
| JP | 01-123933 | * | 5/1989 |
| JP | 06-281171 | * | 10/1994 |
| JP | 06-307685 | * | 11/1994 |
| JP | 09-133369 | * | 9/1997 |
| JP | 2001-132997 | * | 5/2001 |

* cited by examiner

PRESSURE CONTROLLER FOR A MECHANICAL DRAFT SYSTEM

CROSS-REFERENCE TO RELATED APPLICATIONS

This application claims the benefit of priority under 35 U.S.C. 119(e) to now abandoned U.S. provisional application No. 60/453,086, filed on Mar. 6, 2003, and entitled "Systems and Methods Involving Modulating Pressure Controls," which is hereby incorporated by reference in its entirety into the present disclosure.

TECHNICAL FIELD

The present disclosure generally relates to exhaust systems or mechanical draft systems. More particularly, the disclosure relates to systems and methods for controlling air pressure within a mechanical room of a mechanical draft system.

BACKGROUND

The boiler rooms, or mechanical rooms, of a building can house a number of combustion appliances, such as water heaters, furnaces, and boilers, which are used for heating purposes within the building. Within conventional mechanical rooms, many control devices are used for controlling the different components therein. For example, each individual furnace or boiler may be connected to a respective control device that controls the flow of combustion air and exhaust air through that furnace alone. The control device may also effect a furnace shut down procedure during unstable conditions. Mechanical rooms can also house one or more control devices for controlling a ventilating blower and one or more control devices for controlling an induction draft blower. With the large number of control devices in the mechanical room providing various functions, coordination among the various controllers can be quite complex. Furthermore, in this regard, components and functions can be unnecessarily duplicated.

It has been contemplated to coordinate the control of the ventilating blower and induction draft blower to regulate the air flow through the mechanical room. However, until now, greater processor functionality has yet to be achieved for simplifying the installation and control of mechanical draft systems.

During installation of a conventional mechanical draft system, very little feedback is provided to the installers to indicate whether or not the components are properly connected in the system. Because of this deficiency, correcting any problems after installation becomes much more difficult. It would be beneficial to the installers to receive positive feedback to determine whether or not corrections should be made during installation.

One concern that has been identified regarding conventional mechanical draft systems is their lack of intelligent processing functionality for controlling furnaces or boilers during less than optimal conditions. In those systems, furnaces or boilers are typically shut down and prevented from operating until an error or problem in the system is corrected. This all-or-nothing approach can result in a number of machines sitting idly during times of great need. Therefore, a void exists in the prior art for allowing a system to operate in a low output state during less than optimal conditions and to operate in such conditions without compromising safety and efficiency.

SUMMARY

Disclosed herein are methods and systems for controlling the flow of air through a mechanical draft system. One pressure controller for controlling air flow comprises an appliance controller configured to control the operation of a plurality of appliances, an intake fan controller configured to control the speed of an intake fan, and an exhaust fan controller configured to control the speed of an exhaust fan. In addition, the pressure controller comprises a processor configured to receive a differential pressure signal and to control the operation of the appliances, the speed of the intake fan, and the speed of the exhaust fan in response to the differential pressure signal.

An embodiment of a control system disclosed herein controls air pressure in a mechanical draft system and comprises means for determining a difference in pressure between the atmosphere and the interior of a mechanical room. The control system also includes means for controller the speed of an intake fan and exhaust fan in response to the difference in pressure. Additionally, the control system comprises means for shutting down a plurality of appliances in the mechanical room when the difference in pressure exceeds a threshold.

Also disclosed in the present application are computer programs for performing certain procedures in a mechanical draft system. One program, stored on a computer-readable medium, performs a fan-rotation-check routine using logic configured to receive a fan-rotation-check request. The program also includes logic, in response to the fan-rotation-check request, configured to supply a low power signal to a fan installed in a mechanical draft system, the low power signal causing the fan to rotate at a slow speed, thereby allowing the direction of rotation to be visually inspected.

A method for controlling pressure in a mechanical draft system comprises checking a differential pressure between the interior of a mechanical room and the atmosphere and shutting down a plurality of appliances in the mechanical room when the differential pressure exceeds a threshold. The method also includes adjusting the speed of an intake fan and exhaust fan in the mechanical draft system when the differential pressure is not equalized.

A processor disclosed herein controls a mechanical draft system with means for shutting down a plurality of appliances when a differential pressure exceeds a predetermined threshold limit. The processor also includes means for restarting the appliances one at a time in an order based on a priority list and means for monitoring the differential pressure to ensure that the means for restarting does not cause the differential pressure to exceed the predetermined threshold limit.

One system of the present application operates in order to exercise the bearings of fans in a mechanical draft system. The system comprises a timer operative to time the period of inactivity of appliances in the mechanical draft system and means for determining when the timer reaches a first predetermined time period. Finally, the system includes a fan controller operative to run a fan for a second predetermined time period when the determining means determines that the first predetermined time period has elapsed.

Other systems, methods, features, and advantages of the present disclosure will be apparent to one having skill in the art upon examination of the following drawings and detailed description. It is intended that all such additional systems, methods, features, and advantages be included within this description and protected by the accompanying claims.

BRIEF DESCRIPTION OF THE DRAWINGS

Many aspects of the embodiments disclosed herein can be better understood with reference to the following drawings. The components in the drawings are not necessarily to scale, emphasis instead being placed upon clearly illustrating the principles of the present disclosure. Like reference numerals designate corresponding parts throughout the several views.

DETAILED DESCRIPTION

Disclosed herein are embodiments of systems and methods for controlling components in an exhaust system or mechanical draft system in which combustion air is drawn into a mechanical room and supplied to combustion or heating devices and air exhausted from the combustion or heating devices is vented from the mechanical room into the atmosphere. The controllers of the present disclosure are capable of controlling the on/off state and speed of intake fans and exhaust fans and can also control any number of appliances, such as furnaces or boilers, within the system. The unitary controllers disclosed herein may be configured using microprocessor elements or other suitable electrical components for providing greater functionality than conventional exhaust system controllers. Also, the controllers can be programmed in the field and reprogrammed as desired allowing greater flexibility.

The controllers can be initialized during the installation or set-up of the mechanical draft system. The initialization process involves entering information about the equipment and determining whether the equipment may require additional components to run properly. The controllers may provide installation instructions for the additional components as needed. The initialization process also involves setting maximum and minimum fan speeds and setting pre-purge and post-purge parameters. Initialization also involves determining the number of appliances connected in the system and setting a priority list of the appliances for use when adequate draft cannot be maintained with all appliances running. Also established during installation or set-up is the proper positions of adjustable dampers or baffles for optimal air flow from the individual appliances. The position of a modulating damper is also adjusted to control air flow from cumulative appliances. Moreover, a fan-rotation-check procedure may be run to determine whether or not the fans are rotating in the correct direction.

After set-up and during system operation, the controllers disclosed herein are capable of carrying out a process of operating the fans during long periods of inactivity. This process, referred to herein as a "bearing cycle," allows the fans to run for a short amount of time, such as during off-season times, to exercise the bearing. Reference is now made to the drawings illustrating the embodiments of the mechanical draft system, pressure controllers, and methods of operation.

Figure 1:
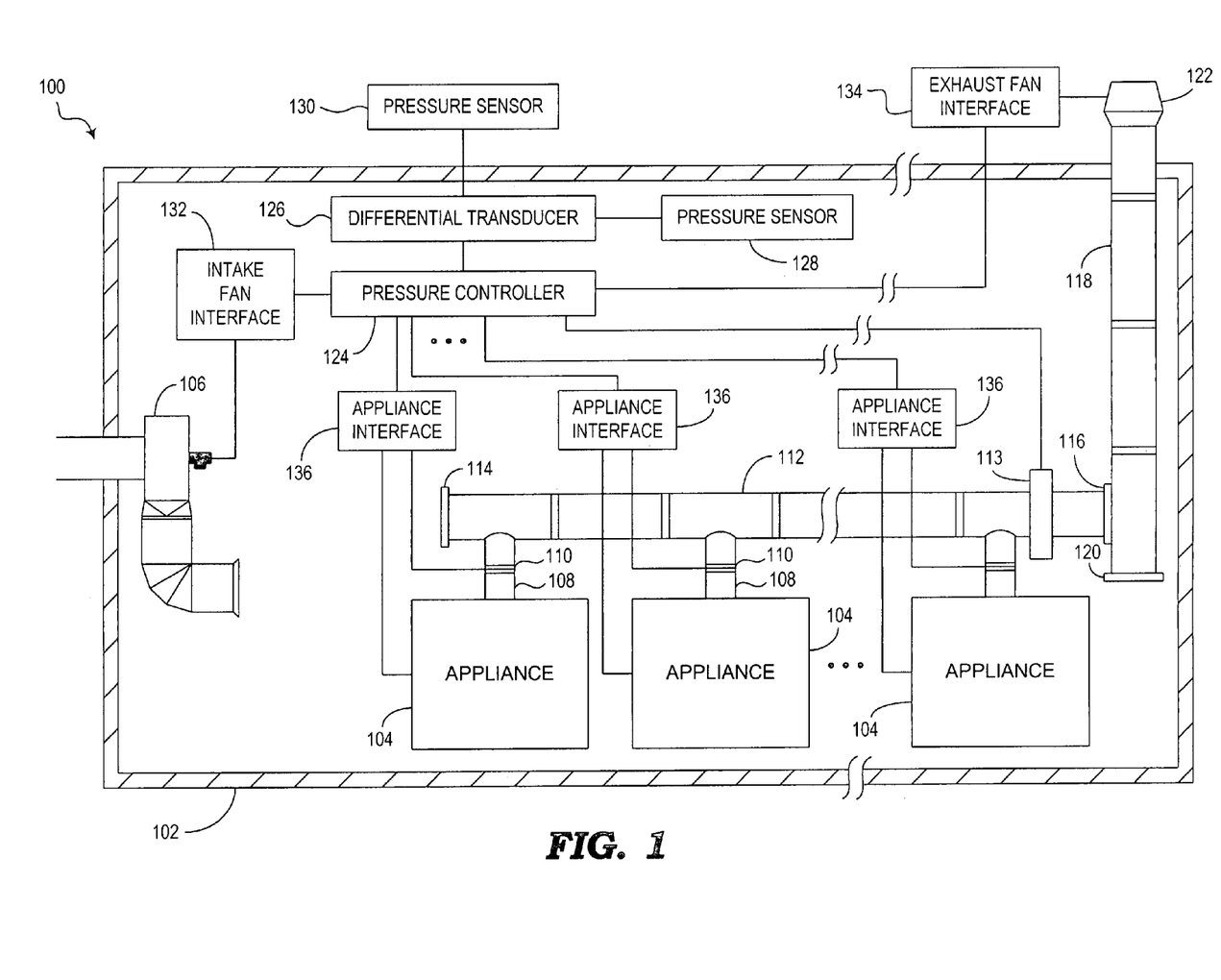
FIG. 1 is a partial block diagram illustrating an embodiment of a mechanical draft system.

FIG. 1 shows an embodiment of a mechanical draft system 100, having components located both inside and outside of a mechanical room 102. The mechanical room 102 may be a boiler room, laundry facility, or other room or enclosed area where a plurality of electrical or mechanical heat generating machines or appliances 104 are used. The appliances 104 may include boilers, modulating boilers, furnaces, water heaters, gas or electric laundry dryers, wood-burning devices, heating devices, etc.

An intake fan 106 draws air from outside the mechanical room 102 into the mechanical room 102 to provide combustible air for the appliances 104. The intake fan 106 may be programmed to increase its speed of rotation when the appliances are fired in order to provide sufficient combustion air. It should be noted that the intake fan 106 may include any well-known type of fan, such as a single-phase fan or three-phase fan. The intake fan 106 cooperates with input ducts that penetrate the walls or ceiling of the mechanical room 102 and lead outside the building. The intake fan 106 and corresponding ducts may have any suitable configuration and may be supported or directed in any suitable manner.

The ducts at the output of the intake fan 106 may lead directly to the appliances 104 in a direct venting configuration. Also, the ducts, if desired, may include diffusers leading to the interior of the mechanical room 102.

The appliances 104 draw air from inside the mechanical room 102 or directly from the intake fan 106 for combustion with a gas-based, oil-based, or wood-based fuel. Exhaust from the appliances 104, in the form of heated gases, smoke, or the like, travels through an air exhaust duct 108, which contains an adjustable baffle or damper 110 for controlling the draft into ducts 112. The damper 110 may have an open position for allowing exhaust to pass through virtually unhindered, a closed position for preventing exhaust from passing, and an intermediate position for balancing the air flow with respect to the exhaust from other appliances 104 in the system.

Air exhausted into the ducts 112 travels through a modulating damper 113, which controls and maintains draft for single or multiple appliances 104. The modulating damper 113 may include multiple blades for controlling the draft. The modulating damper 113 can be used within ducts 112 or within any other type of vent or stack. The modulating damper 113 may be attached to one or more actuators, controllers, pressure sensors, draft probes, and over-pressure safety switches for controlling and maintaining draft. The modulating damper 113 is used when the mechanical draft system 100 generates more draft than the appliances 104 can handle. By modulating the position of the modulating damper 113, a constant draft for the appliances 104 can be maintained.

Upon a call for heat, the modulating damper 113 can be opened completely during a predetermined pre-purge time. When one or more of the appliances 104 are fired and the draft reaches a predetermined draft set-point, the modulating damper 113 modulates to maintain a constant draft. This sequence is repeated every time another of the appliances 104 is fired. When one or more appliances 104 shut down, the modulating damper 113 closes slightly while maintaining the predetermined draft set-point. When the last appliance is shut down, the modulating damper 113 stays open in accordance with any post-purge settings.

The mechanical draft system 100 includes over-pressure protection for a situation where excessive pressure builds up between the outlet of the appliances 104 and the modulating damper 113. When this over-pressure situation occurs, one or more of the appliances 104 are shut down and the modulating damper 113 is opened completely to relieve the pressure within the ducts 112.

The ducts 112 include an end 114 that may include a closed header or an opened barometric damper to balance the system. Exhaust travels through the ducts 112 to another end 116 that is open to a vertical stack or chimney 118. The chimney 118, which may be closed at one end 120, leads the exhaust outside the mechanical room 102 through an exhaust fan 122 at the other end. The exhaust fan 122 draws the exhaust from inside the ducts 112 and chimney 118 into the atmosphere.

The mechanical draft system 100 further includes a pressure controller 124 for maintaining an acceptable air pressure inside the mechanical room 102. The pressure controller 124 controls the speeds of the intake fan 106 and exhaust fan 122 in order to provide an adequate draft through the mechanical draft system 100. By regulating the supply of air to the appliances 104, the energy efficiency of the appliances 104 is greatly improved. Maintaining an equalized air pressure between the atmosphere and the interior of the mechanical room 102 further avoids dangerous operating conditions.

The pressure controller 124 monitors the differential pressure that is calculated from the difference in air pressure between the inside of the mechanical room 102 and the atmosphere. If a positive differential pressure is calculated, indicating excess air pumped into the mechanical room 102 relative to the atmosphere, sometimes referred to as overdraft, then the pressure controller 124 slows down or shuts off the intake fan 106 and/or speeds up the exhaust fan 122 if possible. If a negative differential pressure is calculated based on a lack of adequate air inside the mechanical room 102 relative to the atmosphere, then the pressure controller 124 speeds up the intake fan 106 if possible and/or slows down or shuts off the exhaust fan 122. When a negative differential pressure exists, the pressure controller 124 may additionally adjust the dampers 110 or modulating damper 113 to more greatly restrict the exhaust from the appliances 104. These actions will serve to avoid overdraft, especially during times when the appliances are running at less than full capacity.

If the differential pressure exceeds a predetermined threshold, indicating an excessive difference between the pressure inside the mechanical room 102 relative to the atmosphere, then the pressure controller 124 shuts down the appliances 104. For instance, if the pressure in the mechanical room 102 is 40% above or below a normalized atmospheric pressure, representing a potentially dangerous situation, then the appliances 104 are shut down. The pressure controller 124 may additionally reset the appliances automatically when the differential pressure returns to an acceptable level, thereby avoiding lapses of service, which can result from the use of manual reset switches.

The pressure controller 124 of the present disclosure can be implemented in hardware, software, firmware, or a combination thereof. In the disclosed embodiments, the pressure controller 124 can be implemented in software or firmware that is stored in a memory and that is executed by a suitable instruction execution system. If implemented in hardware, as in an alternative embodiment, the pressure controller 124 can be implemented with any combination of the following technologies, which are all well known in the art: one or more discrete logic circuits having logic gates for implementing logic functions upon data signals, one or more application specific integrated circuits (ASICs) having appropriate logic gates, a programmable gate array (PGA), a field programmable gate array (FPGA), etc.

The pressure controller 124 receives a differential pressure signal from a differential transducer 126. The differential transducer 126 calculates the differential pressure based on a first pressure reading from inside the mechanical room 102 and a second pressure reading from outside the mechanical room 102, preferably from the atmosphere. The first pressure reading may be taken from an open port in the differential transducer 126 or may optionally be taken from a first pressure sensor 128. The first pressure sensor 128 may be attached to an interior wall of the mechanical room 102 or may be secured inside the ducts 112 or chimney 118. The second pressure reading may be taken from a second pressure sensor 130, preferably located on a roof top of the building.

The pressure controller 124 ensures that a proper draft is maintained through the mechanical draft system 100 by transmitting signals to various components via interface devices. For example, an intake fan interface 132 is positioned between the pressure controller 124 and the intake fan 106. An exhaust fan interface 134 is positioned between the pressure controller 124 and the exhaust fan 122. Appliance interfaces 136 are positioned between the pressure controller 124 and each respective appliance 104.

The intake fan interface 132 and exhaust fan interface 134 may include a power source (not shown), such as a variable frequency drive (VFD), for supplying three phase power signals when the fans are three-phase fans. The intake fan interface 132 and exhaust fan interface 134 may also monitor characteristics of the fans and indicate various information to the pressure controller 124. For instance, the interfaces 132 and 134 may indicate to the pressure controller 124, the existence of the fans. If a fan does not exist on the intake or exhaust side, then the pressure controller 124 can bypass any control functions intended for the missing fan. The interfaces 132 and 134 may also indicate whether the fans are operating properly and if the fans are malfunctioning. The interfaces 132 and 134 also sense the speed of the respective fans and indicate the speeds to the pressure controller 124. Furthermore, the interfaces 132 and 134 receive control signals from the pressure controller 124 for adjusting the speeds of the respective fans.

The appliance interfaces 136 may contain a proven draft switch (not shown) which receives a signal from the pressure controller 124 to shut down the appliances when insufficient draft is detected. The appliance interfaces 136 may also receive signals from the pressure controller 124 to adjust the position of the dampers 110, thereby controlling the exhaust from individual appliances 104. The modulating damper 113 may optionally be configured to be controlled by the appliance interfaces 136. The appliance interfaces 136 may also transmit signals to the pressure controller 124 to indicate various information about the appliances 104 and dampers 110. For example, the appliance interfaces 136 may inform the pressure controller 124 of the presence of the respective appliances 104 so that the number of appliances 104 connected in the mechanical draft system 100 can be determined. The appliance interfaces 136 may also indicate whether or not the appliances 104 are currently running for monitoring periods of inactivity. The appliance interfaces 136 may also indicate the presence and position of the dampers 110.

Figure 2:
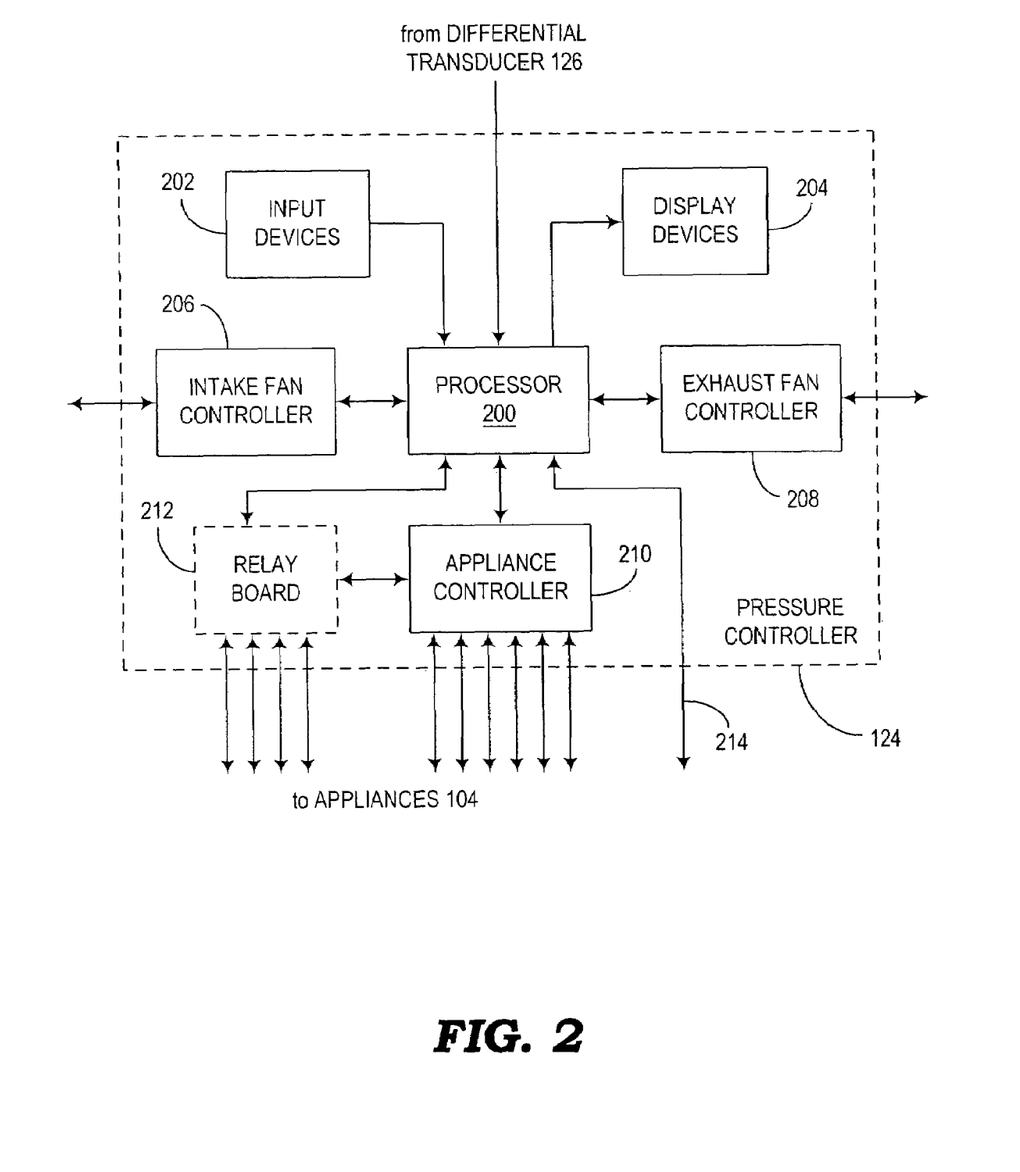
FIG. 2 is a block diagram of an embodiment of the pressure controller shown in FIG. 1.

FIG. 2 is a block diagram of an embodiment of the pressure controller 124 shown in FIG. 1. In this embodiment, the pressure controller 124 includes a processor 200, such as a microprocessor or the like. The processor 200 preferably contains electrically erasable programmable read only memory (EEPROM) or other suitable memory device for storing settings and parameters established during set-up of the mechanical draft system 100. When the processor 200 is configured with a memory device such as EEPROM, an advantage can be realized in that the software of the processor 200 can be upgraded in the field during set-up or during normal system operation to include new controller functions for controlling mechanical draft systems.

The pressure controller 124 of FIG. 2 contains input devices 202 for receiving inputs from an installer, programmer, and/or technician. The input devices 202 may be configured as input buttons, keypads, keyboards, or other suitable input mechanisms. The pressure-controller 124 also contains display devices 204, such as liquid crystal display (LCD) and light emitting diode (LED) components, for displaying various information about the condition of the mechanical draft system 100. For example, the display devices 204 may show the differential pressure, actual pressure in the mechanical room 102, alarm conditions, etc., and may indicate whether or not the intake fan 106 and exhaust fan 122 are functioning properly. The display devices 204 may also show information as it is being entered in the input devices 202.

The input devices 202 may include means for overriding automatic control of the processor 200 and for allowing manual control. During set-up of the mechanical draft system 100, the input devices 202 may be used for entering various information. For example, during set-up, the maximum and minimum fan speeds may be entered. Also, an input may be entered notifying the processor 200 how many appliances 104 are to be connected in the mechanical draft system 100. Also, with a plurality of appliances 104 in the system, priority information can be entered to establish a priority list dictating which appliances 104 should be allowed to run during a condition in which the exhaust fan 122 is malfunctioning or when the exhaust fan 122 has reached its maximum speed and cannot provide adequate draft. This priority mode is described in more detail below.

The pressure controller 124 further includes an intake fan controller 206 and an exhaust fan controller 208. The intake fan controller 206 receives information from the intake fan interface 132 (FIG. 1) for analysis by the processor 200. When the processor 200 detects a differential pressure that exceeds a predetermined threshold, the processor 200 may increase, decrease, or shut off the intake fan 106 via the intake fan controller 206. If the intake fan 106 is a single-phase fan, the intake fan controller 206 may contain a triac board, which may be configured to supply a 10-volt signal to the intake fan 106. Likewise, the exhaust fan controller 208 receives information from the exhaust fan interface 134 and adjusts the speed of the exhaust fan 122. The exhaust fan controller 208 may also contain a triac board if necessary. If one or the other fan is not connected to the mechanical draft system 100, the pressure controller 124 bypasses the respective controller 206 and 208 and compensates for the absence of the fan.

FIG. 2 further illustrates the pressure controller 124 having an appliance controller 210 that can shut down or restart the appliances 104 when necessary.

The appliance controller 210 includes six outputs for controlling up to six appliances 104. The appliance controller 210 may also control the position of the dampers 110 located at the exhaust ducts 108 of each appliance 104 and/or the position of the modulating damper 113. In this regard, the position of the dampers 110 and 113 may be completely open, completely closed, or adjusted to a desirable intermediate position.

The pressure controller 124 may optionally contain a relay board 212 when more than six appliances 104 are connected in the mechanical draft system 100. The relay board 212 includes four terminals for shutting down or restarting four additional appliances 104, thereby increasing the possible number of appliances that can be controlled by the pressure controller 124 up to ten. The pressure controller 124 further includes one or more external communication links 214. The external communication links 214 may also include connections to one or more external relay boards (not shown) when more than ten appliances are installed in the mechanical draft system 100. The external relay boards may be incorporated within relay boxes (not shown) that can be connected in a daisy chain fashion. Using the relay boxes, the pressure controller 124 may be configured to control an unlimited number of appliances 104.

The external communication links 214 may include other features as well. For example, the external communication links 214 may include an RS-232 port for communicating with an external computer, such as a computer used in a building management system. The external communication links 214 may also include inputs for receiving software updates for reprogramming the processor 200 in the field according to any mechanical draft system pressure control advances that may be developed in the future.

According to the embodiment of the pressure controller 124 shown in FIG. 2 and according to other various embodiments that may be contemplated based on the teachings herein, the processor 200 can perform a number of functions that have not been performed in previous exhaust systems and mechanical draft systems. For example, typical exhaust system processors may control either an intake fan or an exhaust fan, but usually do not control both intake fans and exhaust fans. Furthermore, typical exhaust system processors are not capable of controlling up to six appliances as is possible with the processor 200. The expandability of the system to manage an unlimited number of appliances with one processor is also an advantage that the processor 200 has over typical processors. In additional to these advantages, the processor 200 can perform other functions as well, as is explained below.

When a three-phase fan is installed in the mechanical draft system 100, the processor 200 may include an option to run the mechanical draft system 100 in a rotation check mode, which involves powering three-phase intake and/or exhaust fans at a low level when the fans are first installed. Since the direction of fan rotation is difficult to observe when a fan is rotating at typical operating speeds, sometimes creating a strobe effect that increases the difficulty, installers can benefit from the rotation check mode to avoid mistakenly determining fan rotation.

Figure 5:
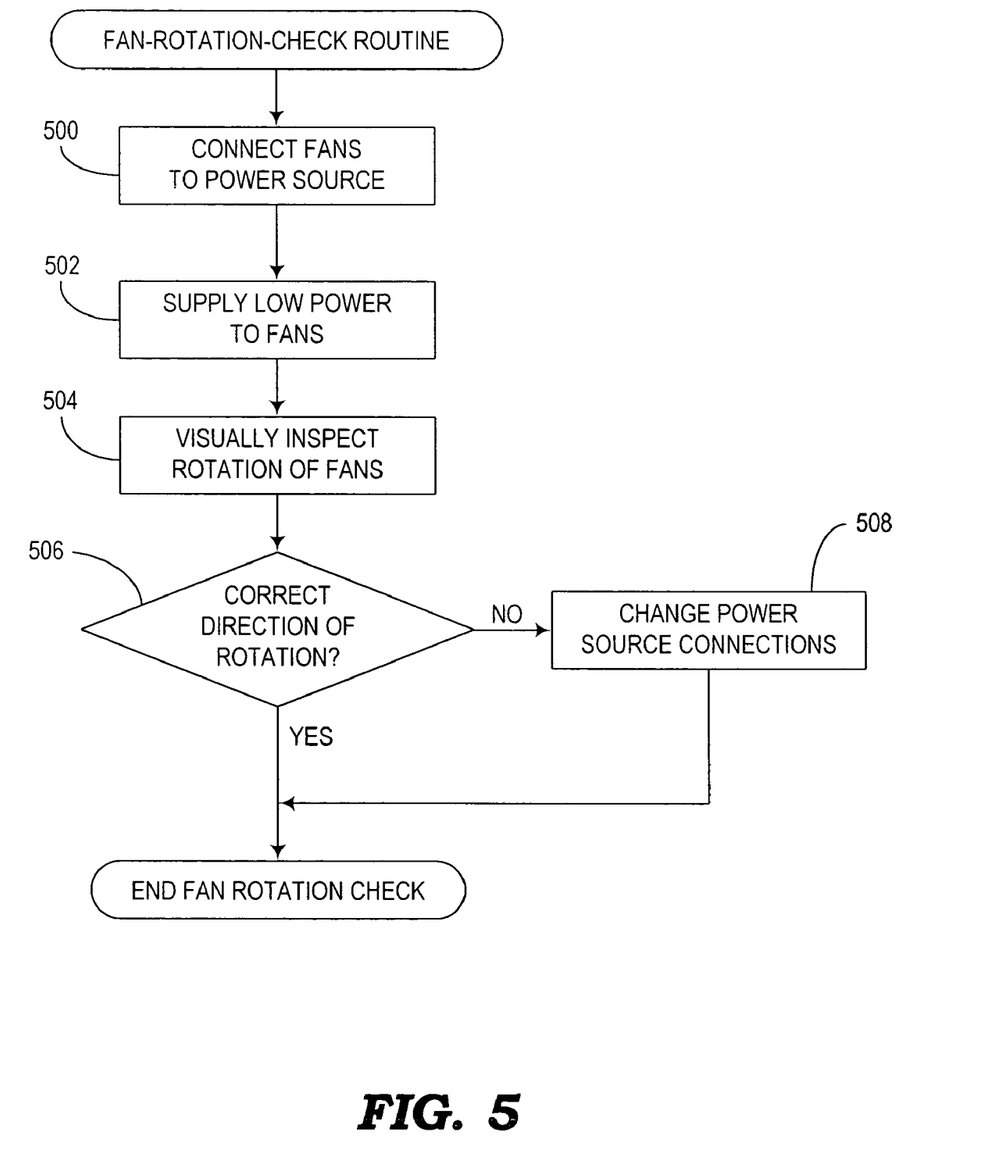
FIG. 5 is a flow chart of an embodiment of a fan-rotation-check routine for a mechanical draft system.

When a specific fan-intake-check input is received by the input devices 202, the input devices 202 signal the processor 200 to run the rotation check mode. In the rotation check mode, the processor 200 signals the intake fan controller 206 and/or the exhaust fan controller 208 to provide a low power signal to the respective fans. With low power applied thereto, the fans will rotate at a very slow speed, which may not be particularly useful for moving air but can clearly demonstrate to an observer the direction of rotation of the fan. The installer can observe the rotation of the newly installed fan in the rotation check mode to see whether or not the fan is rotating in the correct direction. If not, then it will be known that the terminals from the power source to the three-phase fan have been reversed. If reversed, the installer can correct the power connections so that the fan will rotate in the correct direction to force air appropriately. FIG. 5 illustrates an embodiment for checking fan rotation and is described in more detail below.

The processor 200 may also contain a memory device for storing a priority list that may be entered during the set-up of the mechanical draft system 100.

Utilizing the priority list, the processor 200 can run a priority control procedure during less than optimal operating conditions. For instance, when the exhaust fan 122 is malfunctioning, or if it has reached its maximum speed and cannot provide sufficient draft to relieve a pressure build-up in the chimney 118 or mechanical room 102, then the priority control procedure is performed.

When one of the above conditions is detected, the priority control procedure is initiated. First, the processor 200 shuts down all the appliances via the appliance controller 210, the relay board 212, and/or the external communication link 214 and relay boxes. The processor 200 continues to check the differential pressure periodically and starts up the first appliance on the priority list. If a natural draft can be maintained with the one appliance added, then a second and subsequent appliances can be added until the differential pressure becomes unacceptable. At this level, the last added appliance is shut off to keep the pressure within acceptable tolerances. Additionally, the processor 200 continues to check the condition of the exhaust fan 122 to determine when it can operate properly again. Once the exhaust fan 122 is determined to be functional, the processor 200 resets or restarts the appliances 104 to their previous operating condition by signals through the appliance controller 210, relay board 212, and/or relay boxes.

The processor 200 may additionally be configured, based on installation instructions, to run in a continuous mode. In the continuous mode, the fans run continuously, even when the appliances 104 are shut down. When the appliances are running, the fans may be set to any level up to their maximum levels. When the appliances are off, the fans may be set to their minimum speed level.

Alternative to the continuous mode, the processor 200 may be configured to shut the fans off during periods of appliance inactivity. In this discontinuous mode, the processor 200 may initiate a pre-purge mode and/or a post-purge mode during transition periods between an appliance on-state and an appliance off-state. In this mode, when the appliances are off and a request for appliance operation is made, the processor 200 initiates the pre-purge mode in which the fans are turned on for a predetermined time before the appliances are actually fired. When the appliances are on and a request is made to shut the appliances off, the processor 200 shuts the appliances down and allows the fans to continue running for a predetermined time. During set-up of the mechanical draft system 100, an installer may input parameters concerning the minimum and maximum speeds of the fans, whether the system will run in a continuous mode or a discontinuous mode, pre-purge and post-purge parameters (when in the discontinuous mode), etc.

Furthermore, the processor 200 may be configured to maintain an error log of errors detected in the mechanical draft system 100. For instance, when a fan is indicated as being faulty, the processor 200 may save a record of the time and duration that the fan is out of service. The processor 200 may also indicate errors by a warning or alarm signal on the display devices 204. The tolerances within which the mechanical draft system 100 operates can be entered during system set-up, thereby determining the criteria by which the processor 200 detects errors, indicates alarm conditions, and/or controls fans and appliances.

Another feature that the processor 200 may possess is a procedure for running the fans in a discontinuous mode during long periods of inactivity, referred to herein as a bearing cycle. The bearing cycle runs the fans when they have not been running for a long time in order to work the bearings of the fans and to help lubricate the fans, thereby potentially extending the life span of the fans. The bearing cycle involves timing the periods of system inactivity with a timing device (not shown), such as, for example, a timer or clock within the processor 200. The processor 200 continuously monitors whether or not the appliances are operating and determines continuous stretches of time when the appliances are off. When the timing device determines that a predetermined period of inactivity has elapsed, the processor 200 signals the intake fan controller 206 and exhaust fan controller 208 to run the fans at a low speed for a short amount of time. The timing device is reset whenever the appliances are turned on or whenever the bearing cycle completes. This bearing cycle may then be repeated intermittently when needed.

Figure 3A:
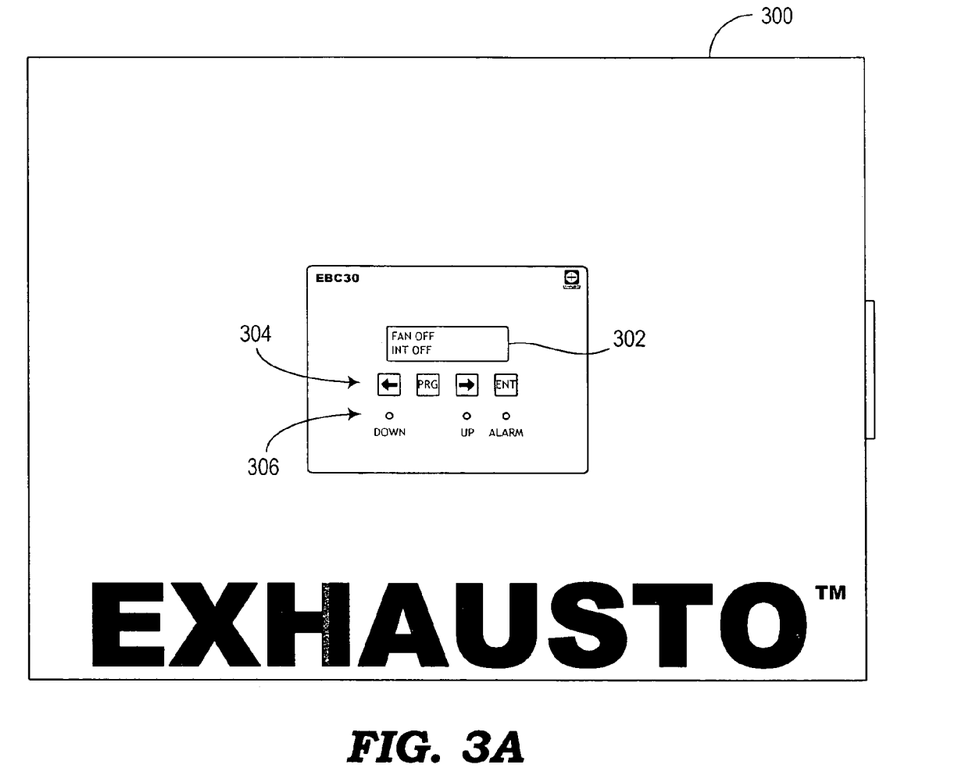
FIGS. 3A and 3B are front and bottom views illustrating an embodiment of a housing for a pressure controller.

FIG. 3A is a front view of an embodiment of a housing 300 that contains the pressure controller 124. The front of the housing 300 includes a display screen 302, such as an LCD window, for showing information about the mechanical draft system 100. The housing 300 also includes program buttons 304 for entering system set-up parameters and for manually controlling the mechanical draft system 100. The program buttons 304, for instance, may include buttons for scrolling through options displayed on the display screen 302, buttons for proceeding through and selecting program functions, and buttons for setting or entering values. The housing 300 further includes LEDs 306 for visually indicating specific conditions of the mechanical draft system 100.

Figure 3B:
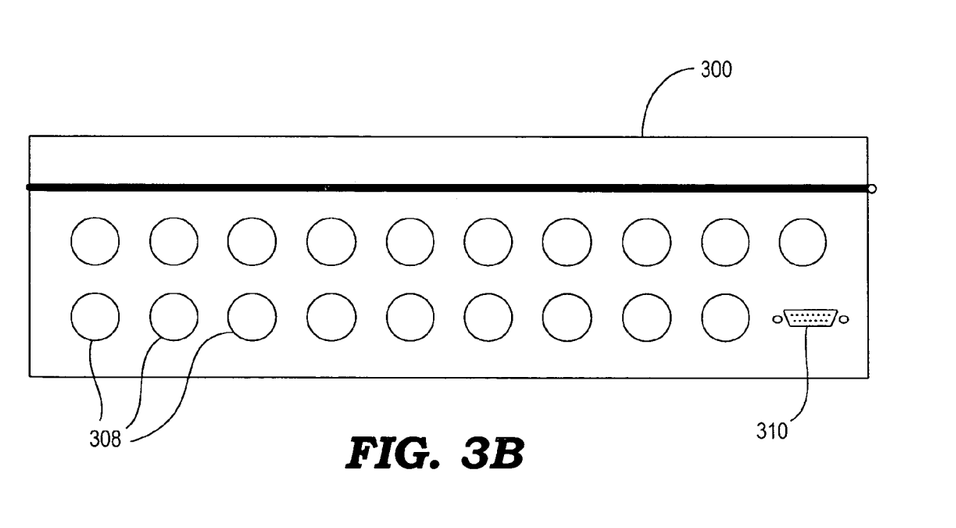

FIG. 3B is a bottom view of the embodiment of the housing 300. The bottom of the housing 300 includes ports 308 for connection to appliances, fans, differential transducers, etc. The housing 300 may also include a communication terminal 304 for connection to an external computer. For example, the communication terminal 310 may be an RS-232 port for communicating with a computer of a building management system. The communication terminal 310 may be used to receive program updates for re-programming or reconfiguring the processor 200 of the pressure controller 124. Furthermore, system parameters may be transmitted to an external computer via a communication network such as the Internet.

Methods of operating a mechanical draft system are now described with respect to FIGS. 4-8. These methods may include functions of a number of the elements described above with respect to FIGS. 1 and 2, including the pressure controller 124 and processor 200. Alternatively, the methods of FIGS. 4-8 may be incorporated as programs stored on the processor 200 or other suitable processor in a mechanical draft system.

Figure 4:
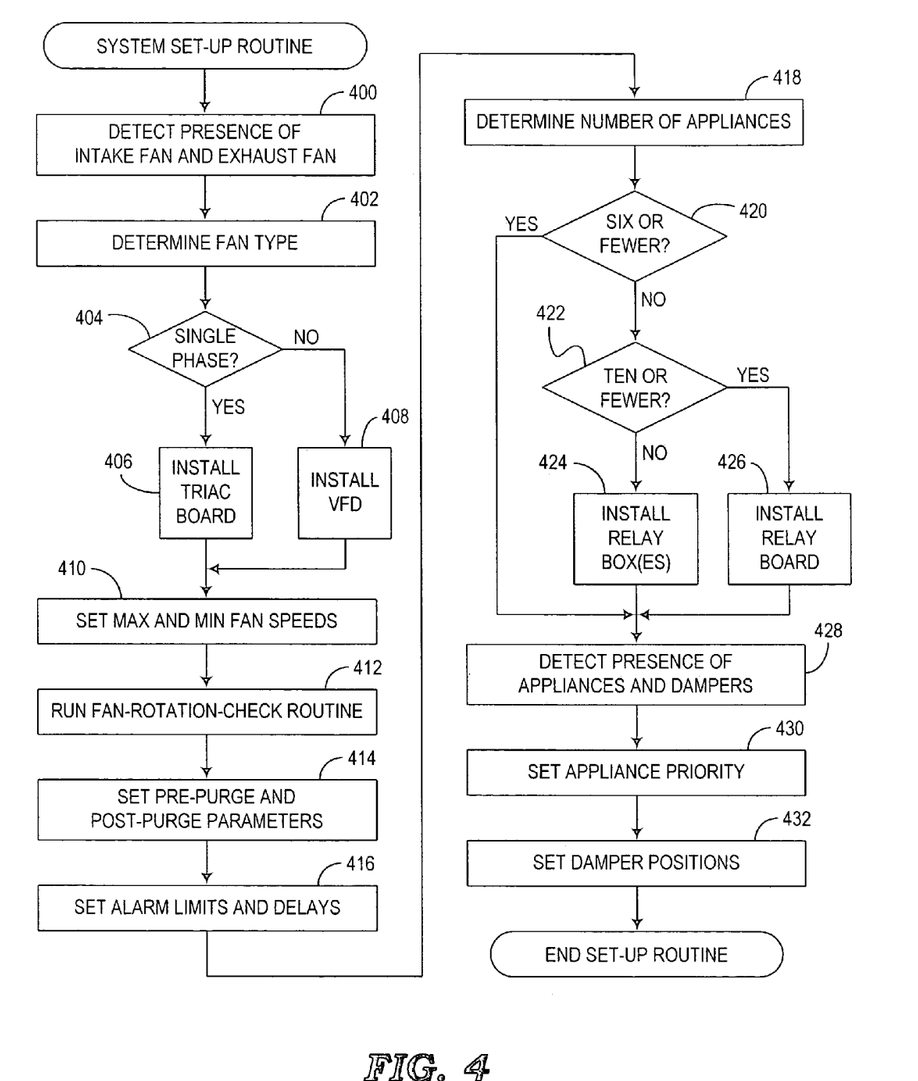
FIG. 4 is a flow chart of an embodiment of a set-up routine for a mechanical draft system.

FIG. 4 is a flow chart of an embodiment of a system set-up routine that may be performed when an exhaust system or mechanical draft system is being set up or installed in a building. Block 400 includes detecting the presence of an intake fan and an exhaust fan to determine what fans will be controlled during system operation. In block 402, the routine determines the types of fans that are present. In decision block 404, it is determined whether each fan is a single phase fan or a three phase fan. If a fan is a single phase fan, flow proceeds to block 406, in which the routine instructs or prompts the installer to install a triac board in a pressure controller so that the proper signal level may be delivered to the fan. If it is determined in decision block 404 that the fan is a three phase fan, then flow proceeds to block 408. In block 408, the routine instructs or prompts the installer to install a variable frequency driver (VFD) in the exhaust system or mechanical draft system so that three phase power signals may be delivered to the fan. It should be noted that blocks 404, 406, and 408 may be repeated for both the intake fan and exhaust fan.

The set-up routine of FIG. 4 next allows the installer to set maximum and minimum fan speeds for the intake fan and the exhaust fan, as indicated in block 410. These limits are set based on schematic and/or physical specifications and/or power capabilities of the respective fans. A minimum fan speed, or idling speed, is set when the mechanical draft system 100 is arranged for continuous use. If the system is configured in a mode where the fans are shut down when the appliances are not in use, referred to as a discontinuous mode, then block 410 may include setting the fan speeds during pre-purge and/or post-purge procedures.

In block 412, the system set-up routine may then run a routine for checking the rotation of three-phase fans to ensure that the power terminals connected to the fans are not wired incorrectly thereby resulting in a fan rotating the wrong way. One embodiment of the fan-rotation-check routine is described in more detail below with respect to FIG. 5. Block 414 includes setting pre-purge and post-purge parameters, such as the length of time that the fans will run after a call for heat has been requested and the length of time that the fans will run after the appliances are turned off. In block 416, the installer is prompted to input information to set alarm limits and delays according to user preferences and/or system design.

In block 418, the number of appliances to be connected in the exhaust system is determined. In decision block 420, it is determined whether or not the number of appliances is six or fewer. If so, then the pressure controller does not need to be altered in any way, since it is capable of handling this number of appliances without additional circuitry, and the routine proceeds to block 428. If there are more than six appliances connected in the exhaust system, then flow proceeds to decision block 422, where it is determined whether or not there are ten or fewer appliances. If there are seven to ten appliances in the system, then flow proceeds to block 426 where the installer is instructed or prompted to install an optional relay board in the pressure controller. With the relay board, the pressure controller may be capable of controlling up to ten appliances. If it is determined in decision block 422 that more than ten appliances are connected in the exhaust system, then flow proceeds to block 424. In block 424, the installer is instructed or prompted to install at least one relay box external to the pressure controller and connect the relay box or boxes to the pressure controller in a daisy chain fashion if necessary. Each relay box allows up to six additional appliances to be controlled. An unlimited number of relay boxes may be connected to allow for controlling any number of a plurality of appliances.

In block 428, the set-up routine of FIG. 4 detects the presence of the appliances and dampers. In block 430, an appliance priority list is set. Typically, appliances high on the priority list are those appliances that are located closest to the vertical stack or chimney. Alternatively, the type of appliance (boiler versus water heater, for example) may dictate which appliances are higher on the priority list. Other priority factor may be considered as well, such as appliances that are larger, newer, or more critical. In block 432, the blade positions of adjustable dampers in the exhaust ducts from each appliance are set in order to adjust the draft from individual appliances. Typically, appliances located closer to a vertical stack or chimney experience greater draft. Therefore, the dampers connected to the appliances in these locations may be adjusted by more greatly restricting exhaust flow from the appliances to account for this phenomenon. Also, block 432 may further include setting the blade position of a modulating damper in ducts receiving the air from the exhaust ducts in order to adjust the draft from all appliances.

FIG. 5 is a flow chart of an embodiment of a fan-rotation-check routine. The rotation of three phase fans may be checked during set-up of the exhaust system or mechanical draft system in order to ensure that the fans are wired to the power source correctly. If the terminals from the power source are reversed, the fan will rotate in a direction opposite from the desired direction, causing the flow of air to be forced in an undesirable manner. When the pressure controller receives a signal to initiate the fan-rotation-check routine, then the procedure, such as the one shown in FIG. 5, is executed.

The procedure for checking the rotation of the fans includes connecting the fans to the power source, as indicated in block 500. After the connections are made, block 502 includes supplying a low power signal to the fans to cause the fans to rotate at a very slow speed. In block 504, the installer may visually inspect the fans to see the direction of rotation. In decision block 506, the installer determines whether or not the direction of rotation is correct. If not, then flow proceeds to block 508, which involves instructing or prompting the installer to change the power source connections leading to the fans. After changing the power terminals, the procedure may end or alternatively may return back to block 502 for rechecking. If it is determined in decision block 506 that the fans are rotating correctly, then the fan rotation check routine ends. Another advantage of running the fan-rotation-check routine during set-up is that the slower fan speeds are safer for the installers.

Figure 6:
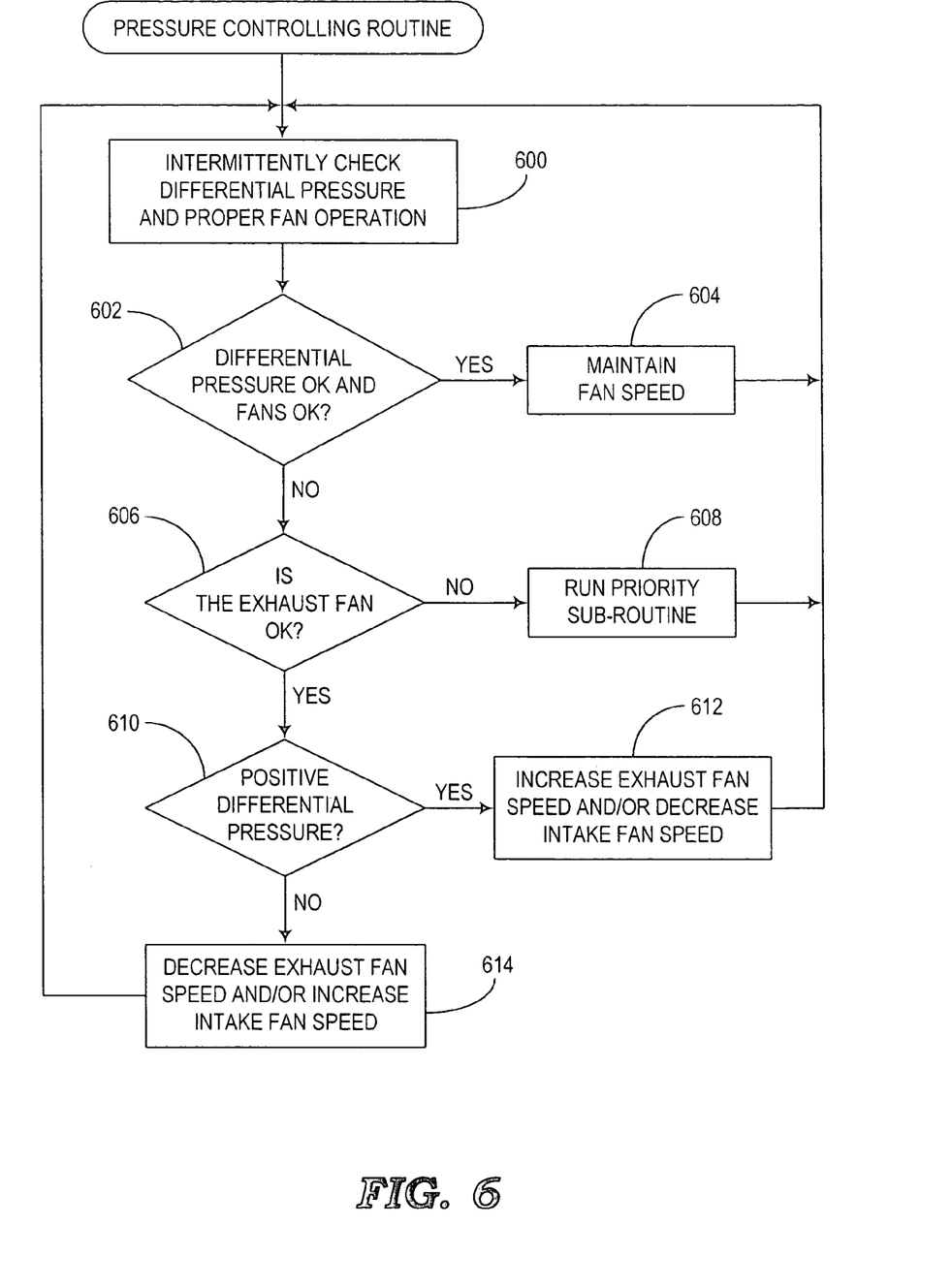
FIG. 6 is a flow chart of an embodiment of a routine for monitoring and controlling air pressure in a mechanical draft system.

FIG. 6 is a flow chart illustrating an embodiment of a routine performed by the pressure controller after set-up and during normal operation of the exhaust system or mechanical draft system. Block 600 indicates that the differential pressure is checked intermittently and the operation of the fans is also checked. In decision block 602, it is determined whether or not the differential pressure is within an adequate range and whether or not the fans are operating properly. If so, the routine is directed to block 604 in which the speed of the fans is maintained. With the fan speeds maintained, flow returns to block 600 for intermittent checking. If it is determined in decision block 602 that the differential pressure exceeds a predetermined threshold or the fans are not operating acceptably, then flow proceeds to decision block 606.

Figure 7:
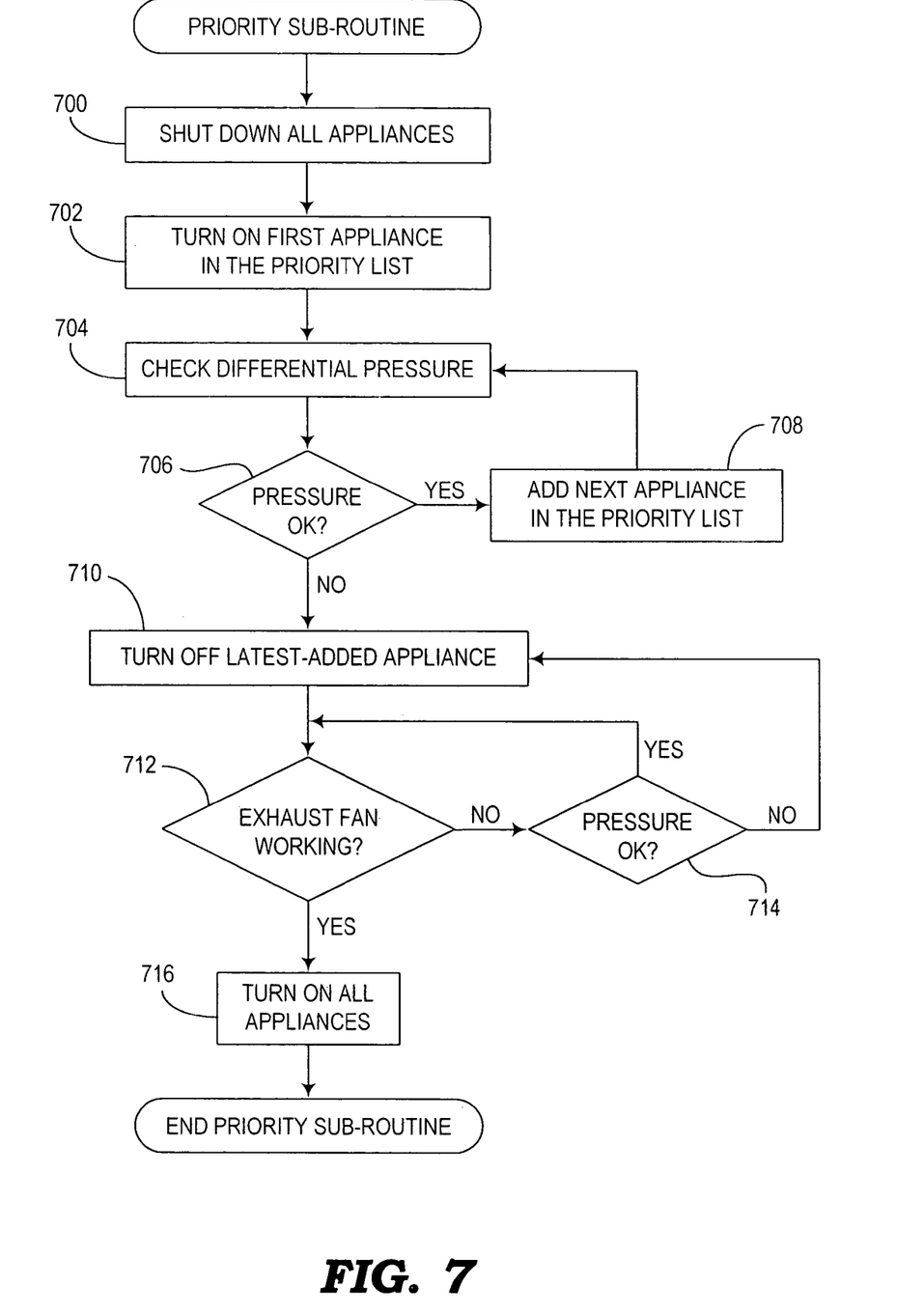
FIG. 7 is a flow chart of an embodiment of a priority sub-routine for a mechanical draft system.

In decision block 606, the specific problem is identified by determining whether the exhaust fan is fine. If not, block 608 is conducted in which a priority sub-routine, such as the routine defined in FIG. 7, is run. Flow then returns to block 600 for continued monitoring. If the problem identified in block 606 is not the fans, then it is determined that the differential pressure is actually the problem. At this point, flow proceeds to decision block 610 for determining whether the out-of-range differential pressure is an excessive positive differential pressure or an excessive negative differential pressure. It should be noted that, in this embodiment, the pressure measured inside the mechanical room is connected to a negative terminal (or reference terminal) of a transducer and the pressure measured in the atmosphere is connected to a positive terminal of the transducer. However, the connections of the pressure measurements to the terminals of the transducer may be reversed if desired, and the proper response according to this routine is carried out.

If it is determined in block 610 that a positive differential pressure is present, thereby indicating that the pressure inside the mechanical room is significantly greater than the atmospheric pressure, then flow proceed to block 612. In block 612, the speed of the exhaust fan is increased and/or the speed of the intake fan is decreased in an attempt to equalize the pressure in the mechanical room. From this point, flow returns to block 600 for again intermittently monitoring the exhaust system. If it is determined in block 610 that a negative differential pressure exists, indicating a pressure inside the mechanical room significantly less than the atmospheric pressure, then the procedure flows to block 614. In block 614, the speed of the exhaust fan is decreased and/or the speed of the intake fan is increased. Furthermore, block 614 may include adjusting the dampers to more greatly restrict the exhaust from the individual appliances and/or from all appliances. The routine then returns to block 600 for continuous intermittent monitoring.

FIG. 7 is a flow chart illustrating an embodiment of a procedure for running a priority sub-routine in the situation when the differential pressure is determined to be outside of an acceptable range and the exhaust fan cannot provide adequate draft. Insufficient draft may be caused by the exhaust fan not operating properly or when the speed of the exhaust fan has reached its maximum speed and a request for a greater speed is called for. In such situations, the appliances are shut down, and a priority list, which is established during system set-up as described above, may then be used to establish which appliance is turned on first, provided that the chimney is capable of naturally exhausting air with an inadequate exhaust fan. If adequate draft can be maintain after restarting the first appliance on the priority list, then the second appliance on the list is turned on. This procedure is repeated until the greatest number of appliances has been turned on while a natural draft can be maintained in the chimney. Reference is now made to the flow chart of FIG. 7.

In block 700, when sufficient draft cannot be maintained and the differential pressure is outside acceptable levels, the appliances are shut down. In block 702, only the first appliance on the priority list is allowed to run. In block 704, after the appliance has run for a short amount of time, the differential pressure is checked again to determine if the chimney provides an adequate natural draft. In decision block 706, it is determined whether or not the differential pressure is within an acceptable range. If it is, the next appliance on the priority list is allowed to operate, as indicated in block 708, and flow returns to block 704 to recheck the differential pressure. Blocks 704, 706, and 708 are repeated until it is determined that the differential pressure is determined to be unacceptable in decision block 706. In this case, the appliance on the priority list that was added last is shut down, as indicated in block 710.

In decision block 712, the priority procedure determines if the exhaust fan is working. If not, then the differential pressure is checked again in decision block 714. As long as the pressure is determined to be fine, the appliances turned on in the exhaust system are allowed to run and the exhaust fan is checked until it is working again. If the pressure is determined to be unacceptable in block 714, the latest-added appliance on the priority list is turned off in block 710. Once it is determined that the exhaust fan is working in decision block 712, all of the appliances may be turned on, as indicated in block 716, and the priority sub-routine ends.

Figure 8:
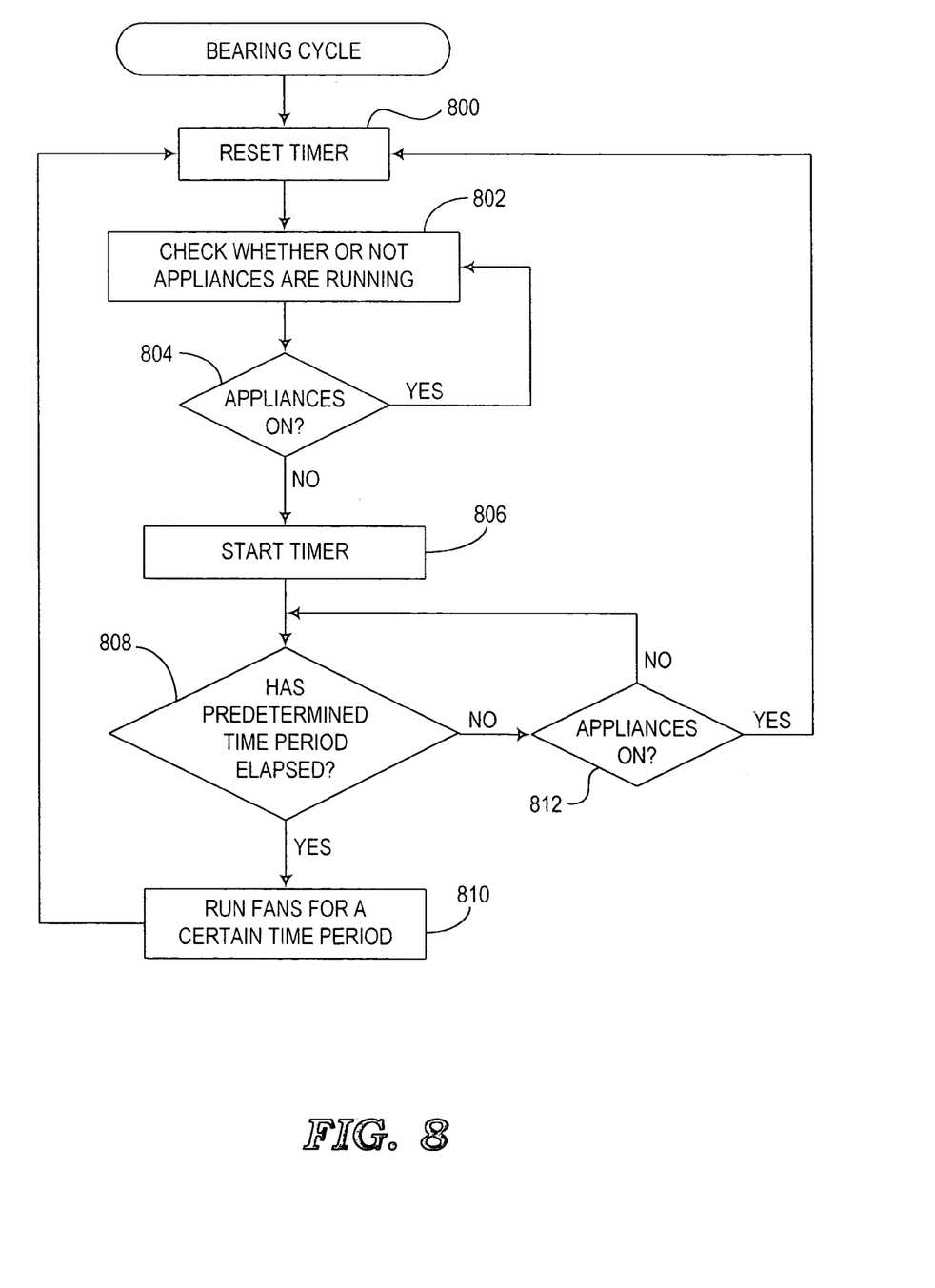
FIG. 8 is a flow chart of an embodiment of a routine for running a bearing cycle in a mechanical draft system.

FIG. 8 is a flow chart illustrating an embodiment of a bearing cycle routine.

A bearing cycle is a cycle of turning the fans on during periods of appliance inactivity. For instance, when heating appliances are not used for long periods of time, such as during warm summer months, the bearing cycle operates the fans for a predetermined amount of time, preferably at a low speed, such as 25% capacity, after a certain period of inactivity. The bearing cycle thus works the bearings of the fans in order to keep the fans from becoming rusty or locking up.

The bearing cycle procedure contains block 800, which includes resetting a timer that is used to determine a continuous length of time that the appliances are not running. In block 802, the appliances are checked to determine whether or not they are running. In decision block 804, if the appliances are running, they are intermittently checked again in block 802 until they are shut down. When the appliances are shut down, the timer is started, as indicated in block 806, to time the length of inactivity. If it is determined in decision block 808 that a predetermined time period has elapsed, indicating an extended period of inactivity, then the fans are turned on for a certain amount of time, as indicated in block 810, to adequately work the bearings of the fans. If the predetermined time period has not elapsed in block 808, then flow proceeds to decision block 812 in which it is determined whether or not the appliances have been called back into service. If they are, then flow returns to block 800 to restart the timer and repeat the process. If the appliances remain off, then the timer continues to run until the predetermined time period has elapsed in block 808.

The flow charts of FIGS. 4-8 show the architecture, functionality, and operation of possible implementations of the mechanical draft system control software. In this regard, each block represents a module, segment, or portion of code, which comprises one or more executable instructions for implementing the specified logical functions. It should also be noted that in some alternative implementations, the functions noted in the blocks may occur out of the order noted in the figures. For example, in the set-up routine of FIG. 4, two blocks shown in succession may in fact be executed substantially concurrently or the blocks may be executed in the reverse order, depending upon the specific functional programming involved.

The mechanical draft system control programs, which comprise an ordered listing of executable instructions for implementing logical functions, can be embodied in any computer-readable medium for use by an instruction execution system, apparatus, or device, such as the processor 200 or other suitable computer-based system, processor-controlled system, or other system that can fetch the instructions from the instruction execution system, apparatus, or device and execute the instructions. In the context of this document, a "computer-readable medium" can be any medium that can contain, store, communicate, propagate, or transport the program for use by the instruction execution system, apparatus, or device. The computer-readable medium can be, for example, an electronic, magnetic, optical, electromagnetic, infrared, or semiconductor system, apparatus, device, or propagation medium. More specific examples of the computer-readable medium include the following: an electrical connection having one or more wires, a portable magnetic computer diskette, a random access memory (RAM), a read-only memory (ROM), an erasable programmable read-only memory (EPROM or Flash memory), an optical fiber, and a portable compact disc read-only memory (CDROM). In addition, the scope of the present disclosure includes the functionality of the herein-disclosed embodiments configured with logic in hardware and/or software mediums.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

We claim:

1. A pressure controller for controlling the flow of air through a mechanical draft system, the pressure controller comprising:
    an appliance controller configured to control the operation of a plurality of appliances;
    an intake fan controller configured to control the speed of an intake fan;
    an exhaust fan controller configured to control the speed of an exhaust fan; and
    a processor configured to receive a differential pressure signal and to control the operation of the plurality of appliances, the speed of the intake fan, and the speed of the exhaust fan in response to the differential pressure signal;
    wherein the processor is further operative to control at least one of the intake fan and the exhaust fan in a bearing cycle mode in which, responsive to the processor determining that at least one of the intake fan and the exhaust fan has been inactive for a threshold time duration, the fan that has been inactive is activated such that internal components of that fan are lubricated.

2. The pressure controller of claim 1, further comprising:
    at least one input device configured to receive inputs for establishing operation parameters of the mechanical draft system; and
    at least one display device configured to display operation conditions of the mechanical draft system.

3. The pressure controller of claim 1, wherein the appliance controller controls up to six appliances.

4. The pressure controller of claim 3, further comprising a relay board, wherein the appliance controller and relay board control up to ten appliances.

5. The pressure controller of claim 3, further comprising an external communication link for connection with one or more relay boxes, wherein the appliance controller and relay boxes control more than ten appliances.

6. The pressure controller of claim 1, wherein the plurality of appliances comprises boilers, furnaces, water heaters, or laundry dryers.

7. The pressure controller of claim 1, further comprising an RS-232 port for connecting the processor to an external processor.

8. The pressure controller of claim 1, wherein the processor comprises an input for receiving the differential pressure signal from a differential transducer and wherein the differential pressure signal is the difference in pressure between the atmosphere and a mechanical room in which the plurality of appliances are located.

* * * * *